No. 653,362. Patented July 10, 1900.
G. W. PACKER.
METAL WHEEL MACHINE.
(Application filed Mar. 30, 1900.)

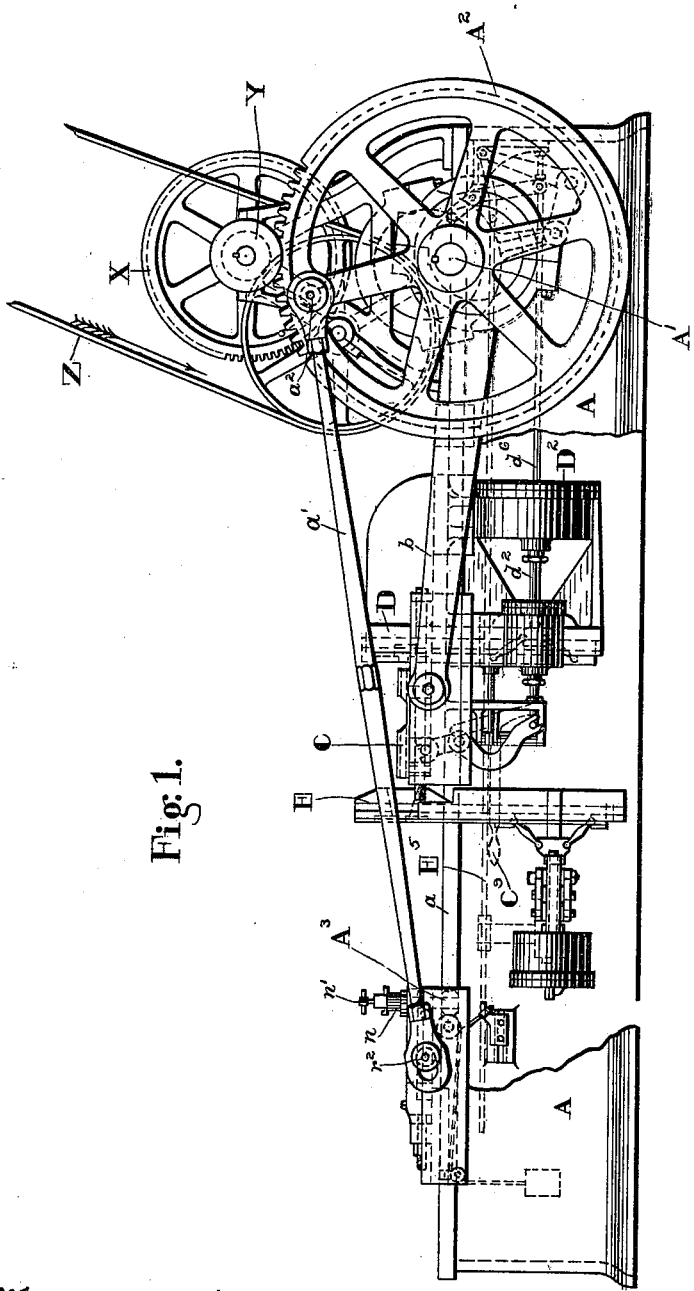

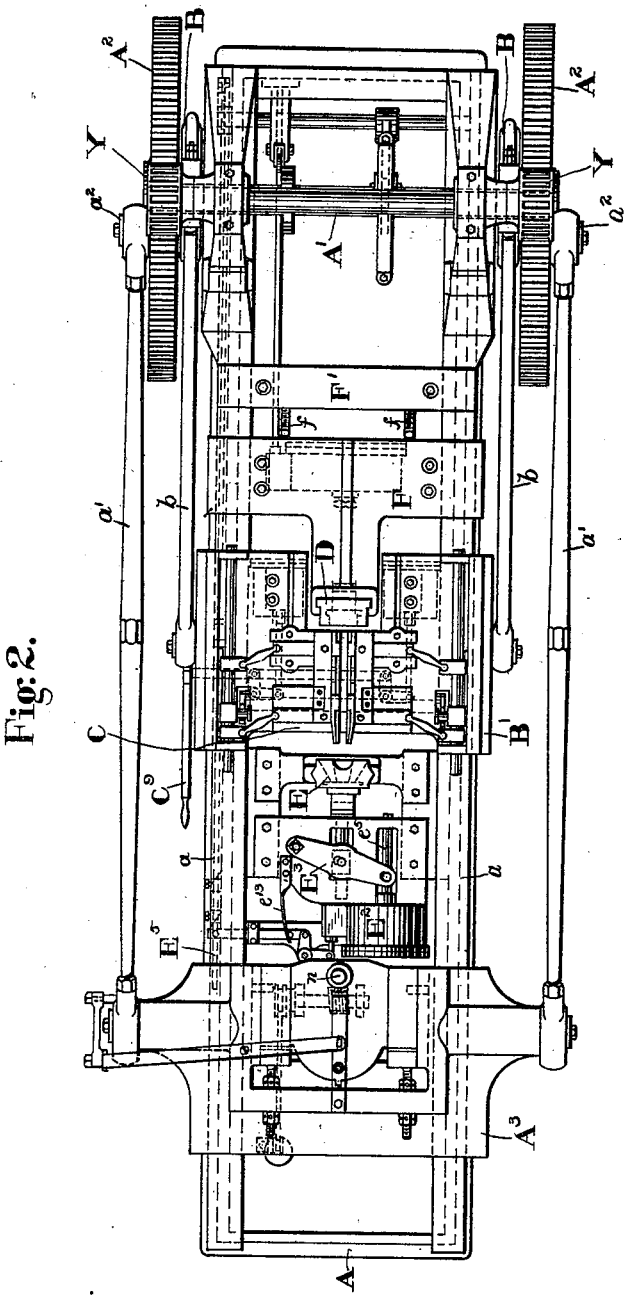

(No Model.) 8 Sheets—Sheet 3.

Witnesses:
Chas. W. Chambers
Wm. A. Dreffein

Inventor:
George W. Packer

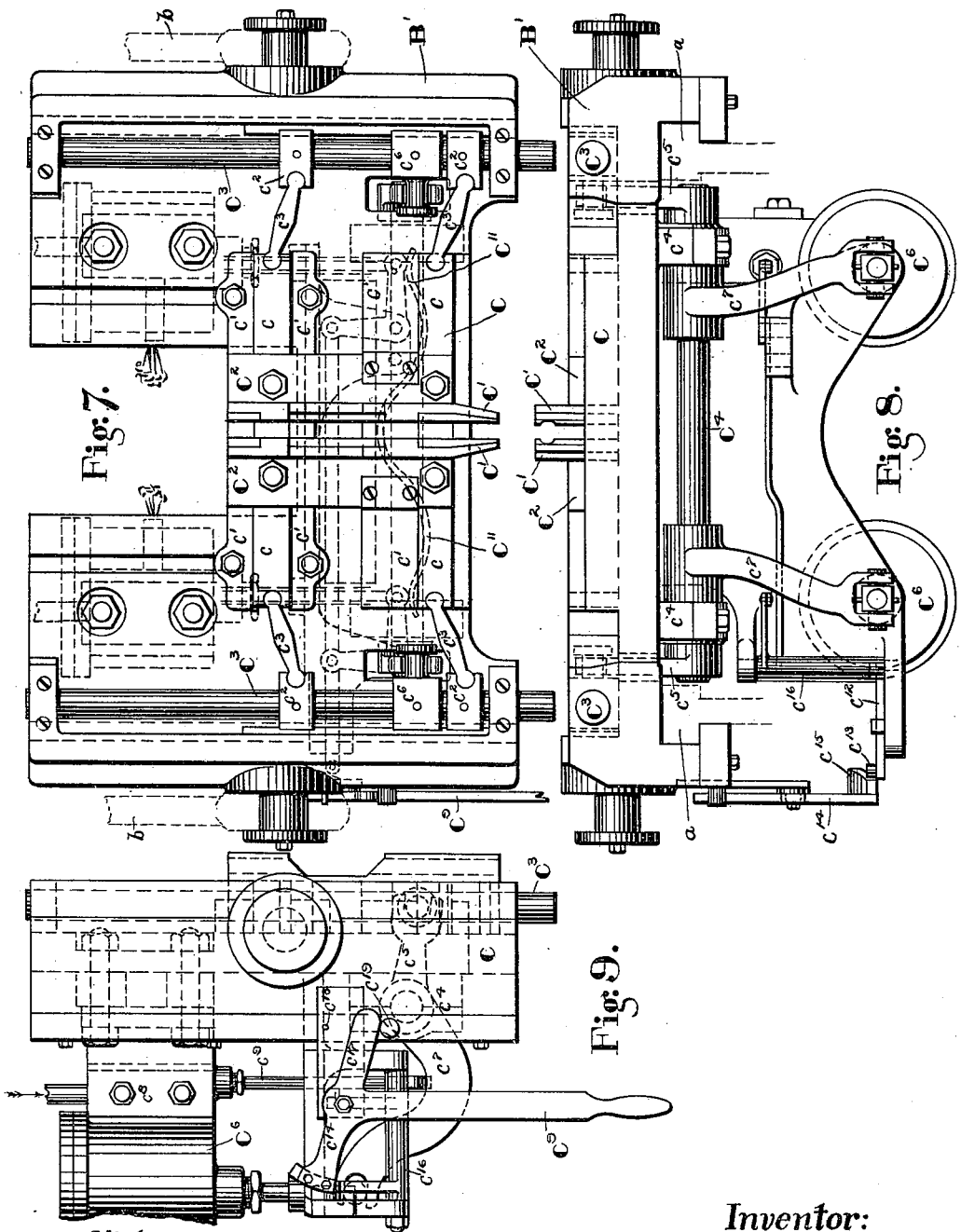

No. 653,362. Patented July 10, 1900.
G. W. PACKER.
METAL WHEEL MACHINE.
(Application filed Mar. 30, 1900.)
(No Model.) 8 Sheets—Sheet 5.

Witnesses:
Chas. M. Chambers.
Wm. A. Dreffein.

Inventor:
George W. Packer

No. 653,362. Patented July 10, 1900.
G. W. PACKER.
METAL WHEEL MACHINE.
(Application filed Mar. 30, 1900.)
(No Model.) 8 Sheets—Sheet 6.
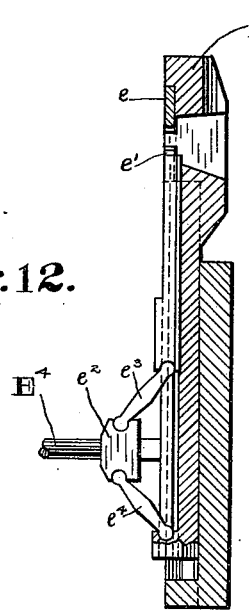
Fig. 12.
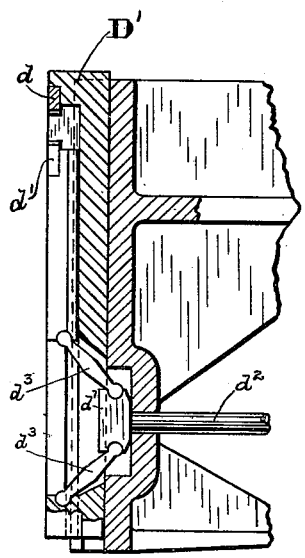
Fig. 13.
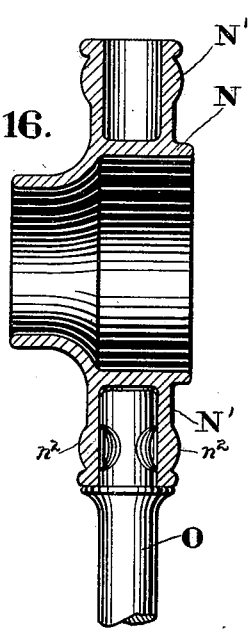
Fig. 16.
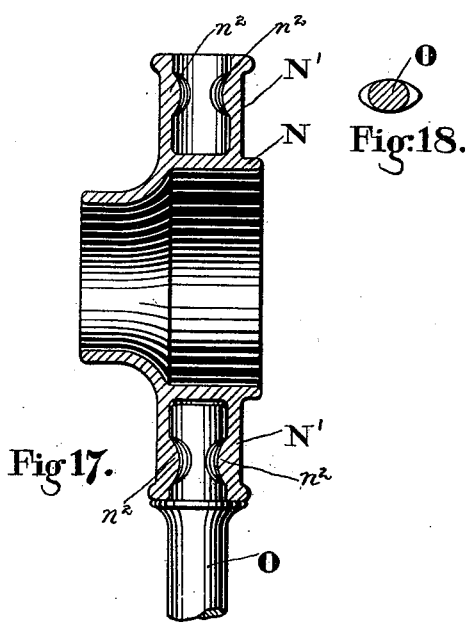
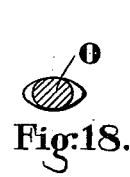
Fig. 17. Fig. 18.
Witnesses: Inventor:
Chas. M. Chambers. George W. Packer
Wm. A. Dreffein.

No. 653,362. Patented July 10, 1900.
G. W. PACKER.
METAL WHEEL MACHINE.
(Application filed Mar. 30, 1900.)
(No Model.) 8 Sheets—Sheet 7.
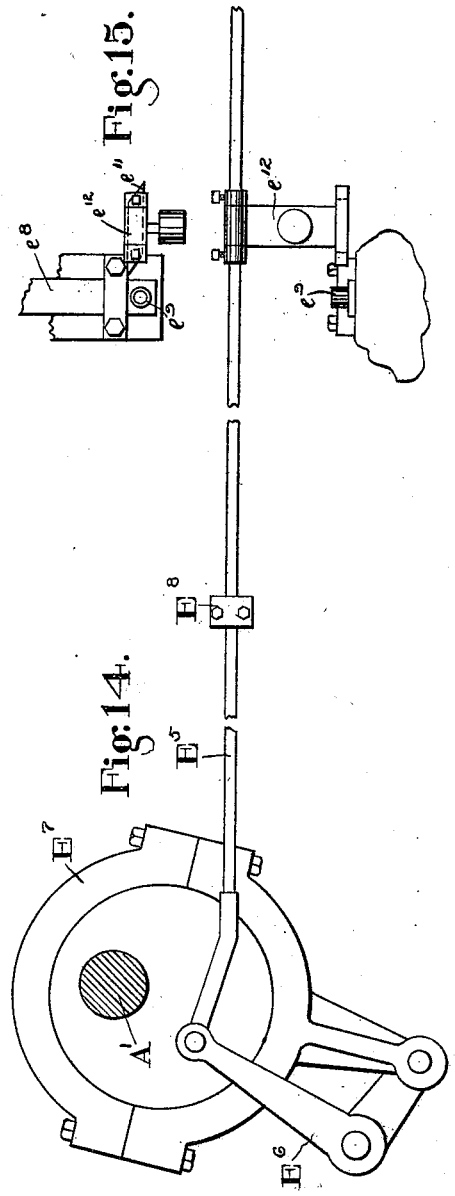
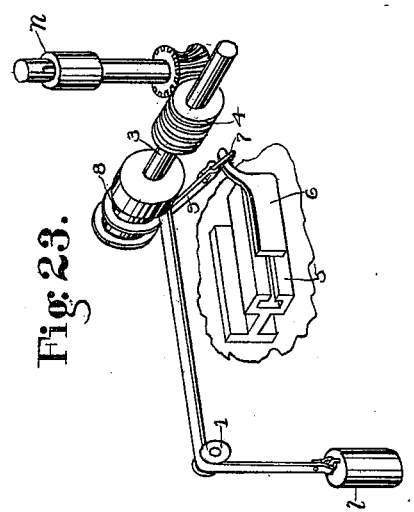
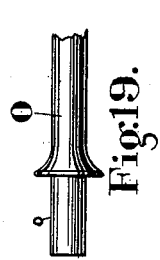
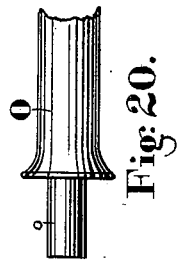
Witnesses: Inventor:
Wm. A. Dreffein. George W. Packer
Marvin Cramer No. 653,362. Patented July 10, 1900.
G. W. PACKER.
METAL WHEEL MACHINE.
(Application filed Mar. 30, 1900.)
(No Model.) 8 Sheets—Sheet 8.

Witnesses: Inventor:
Wm. A. Dreffein. George W. Packer
Marvin Cramer

UNITED STATES PATENT OFFICE.

GEORGE W. PACKER, OF CHICAGO, ILLINOIS.

METAL-WHEEL MACHINE.

SPECIFICATION forming part of Letters Patent No. 653,362, dated July 10, 1900.

Application filed March 30, 1900. Serial No. 10,824. (No model.)

*To all whom it may concern:*

Be it known that I, GEORGE W. PACKER, a citizen of the United States, residing at Chicago, in the county of Cook and State of Illinois, have invented certain new and useful Improvements in Machines for Connecting the Parts of Wheels, of which the following is a specification.

The object of my invention is to produce a simple and effective machine, first, for assembling the hubs and spokes of metal wheels and securing them together; second, for upsetting and forming the tire end of the spokes for such wheels, and, third, for both assembling and securing the spoke and hub and upsetting and forming the tire end of the spoke at one and the same operation by means of the combination of coöperating parts.

Figure 5:
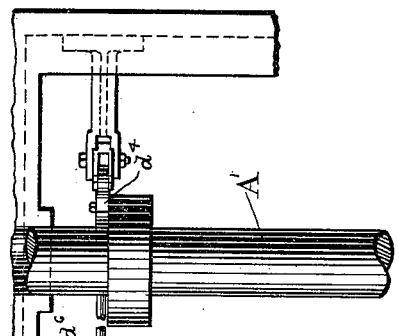
Figure 6:
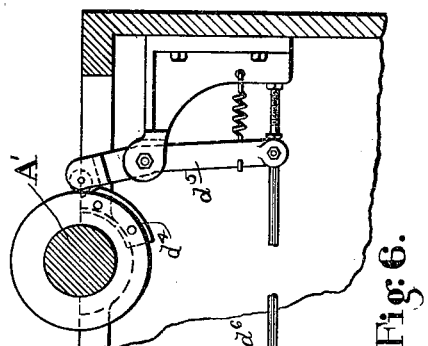
Figure 3:
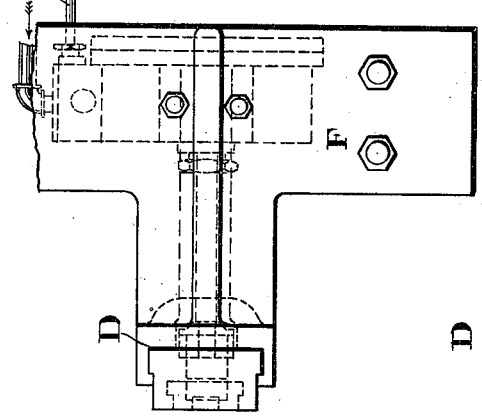
Figure 4:
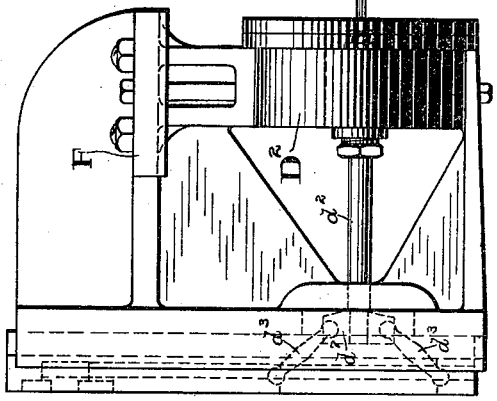
Figure 10:
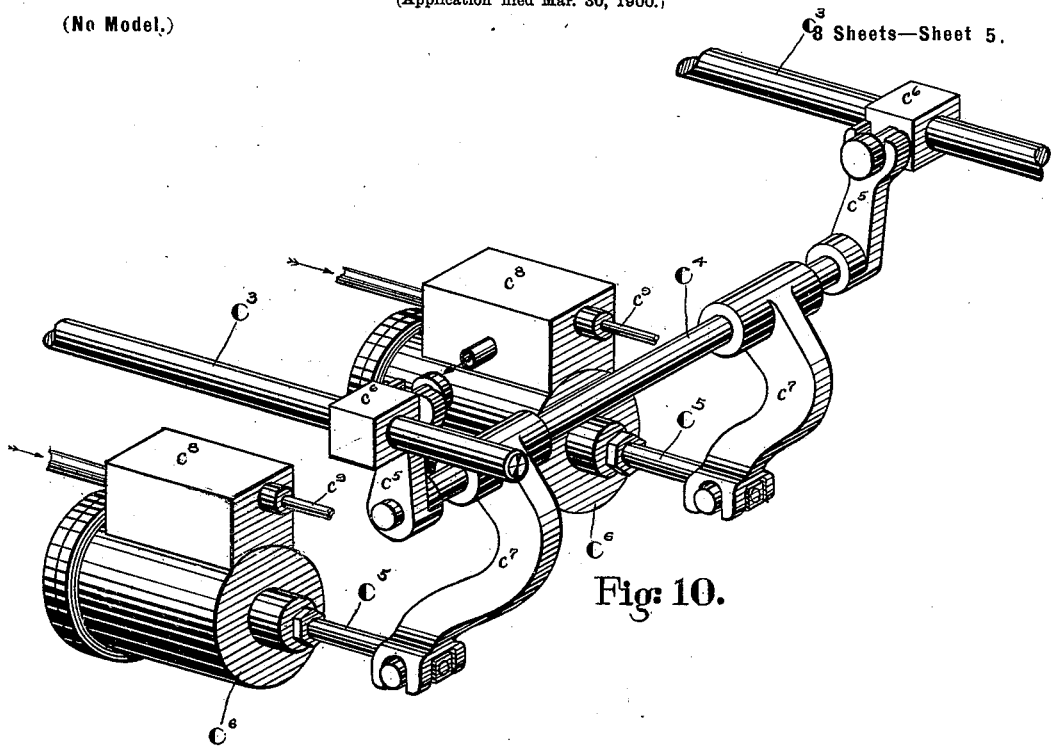
Figure 11:
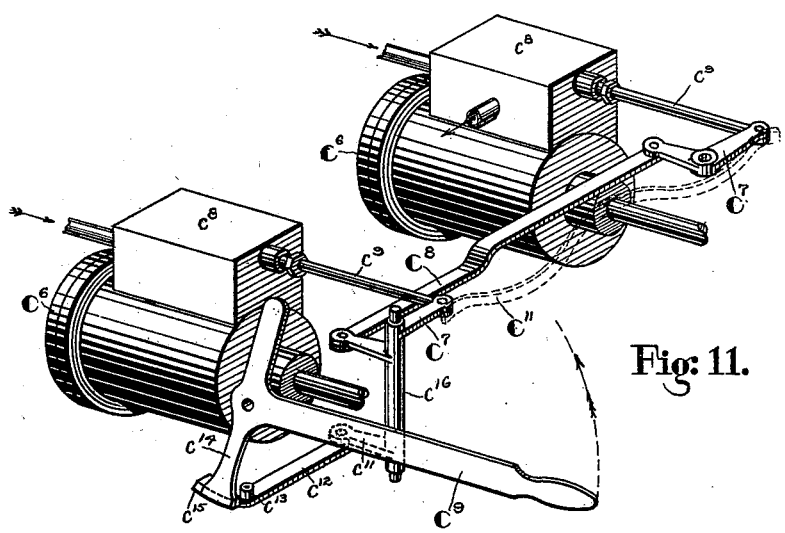
Figure 21:
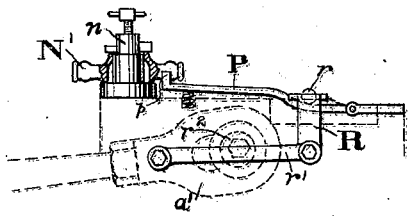
Figure 22:
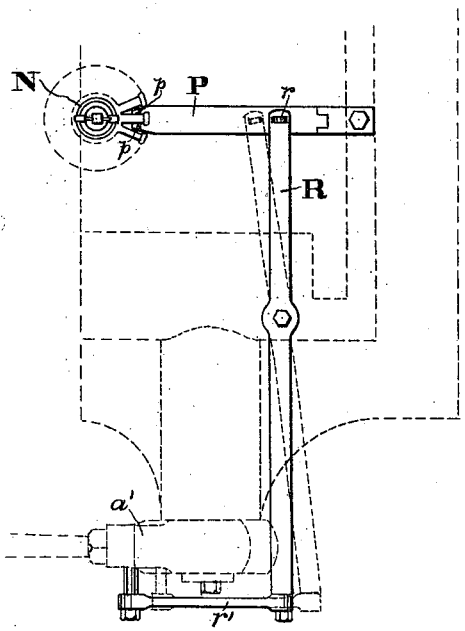

In the drawings, wherein like reference characters indicate like or corresponding parts, Figure 1 is a side elevation of my improved machine with the frame broken away to show the construction. Fig. 2 is a plan view of the same. Fig. 3 is a plan view of the rear clamping device or press. Fig. 4 is a side elevation of the same. Fig. 5 is a plan view of the front clamping device. Fig. 6 is a side elevation of the same. Fig. 7 is a plan view of the middle clamping device. Fig. 8 is an end elevation of the same. Fig. 9 is a side elevation of the same. Fig. 10 is an isometric projection of the piston-and-lever mechanism of the middle clamping device. Fig. 11 is a similar projection of the valve-controlling mechanism of the same. Fig. 12 is a sectional view of the rear clamping-jaws. Fig. 13 is a similar view of the front clamping-jaws. Fig. 14 is a side elevation of the valve-actuating mechanism of the rear clamping device, all other parts being removed to more clearly show the construction. Fig. 15 is a top plan of the valve-trip of the same. Fig. 16 is a sectional view of the hub before the operation of attaching the spokes. Fig. 17 is the same hub after the operation. Fig. 18 is a section of a spoke adapted to be secured to the hub in forming a wheel. Figs. 19 and 20 are respectively edge and side views of the free or rim ends of the wheel-spokes after upsetting. Fig. 21 is a side elevation of a locking device for retaining the hub in proper position. Fig. 22 is a top plan of the same, and Fig. 23 is a detail view of the preferred form of ratchet device to rotate the wheel-hub.

As shown in the drawings, A is a suitable frame or bed having mounted thereon a driven shaft A', carrying at each end a wheel $A^2$ or an equivalent part, provided with wrist-pins $a^2$ $a^2$. A cross-head or carriage $A^3$, mounted upon the bed and guided on its course by ways $a$ $a$, is connected by rods $a'$ $a'$ to the wrist-pins and is reciprocated by the rotation of the shaft for a purpose hereinafter explained. The shaft A' also carries upon it and operates eccentrics B B, which are connected by rods $b$ $b$ to a cross-head or carriage B', also mounted upon the bed A and guided by the ways $a$ $a$ for a purpose hereinafter explained. The shaft A' is driven by any preferred means—as, for example, by a belt Z and intermediate pinions X Y Y, engaging with cogs upon the periphery of the wheels $A^2$ $A^2$ or other equivalent means—at a desired rate of speed.

The machine is provided with three clamping devices C, D, and E, of which C (called the "middle" clamping device) is mounted upon the cross-head B' and reciprocates therewith. D (called the "front" clamping device) is mounted upon an adjustable cross-head F, and E (called the "rear" clamping device or press) is fixed in its relation to the bed and the other clamping devices. The two end devices might properly be called "presses;" but in the specification and claims the rear device only is so styled, because of its particular functions.

Referring first to the construction and operation of the middle clamping device C, (see Figs. 7, 8, 9, 10, and 11,) it will be seen that this device comprises two opposing jaws C' C', arranged to clamp and firmly hold a spoke or equivalent member placed between them. In the preferred construction shown slides $c$ $c$, retained in position by guides $c'$ $c'$, are secured to and operate reinforcing-bars $C^2$ $C^2$, lying on the outer side of each jaw. A longitudinally-movable rod or bar $C^3$ is arranged on each side of the device in bearings formed in the cross-head or carriage B' and is provided with collars $c^2$ $c^2$, secured thereto. Toggle bars or levers $c^3$ $c^3$ extend from the collars $c^2$ $c^2$ to the slides $c$ $c$ and control their movement and that of the jaws C' C'. A rock-shaft $C^4$ extends transversely across the carriage and is supported in bearings $c^4$ $c^4$, secured to or made integral therewith. (See Fig. 8.) Crank-arms $c^5$ $c^5$ on the ends of the shaft engage with blocks $c^6$ $c^6$ on the rods $C^3$, while other crank-arms $c^7$ upon the rock-shaft are engaged by the piston-rods $C^5$ $C^5$ of the air-cylinders $C^6$. The compressed-air apparatus and the connecting parts are also secured to and carried by the cross-head or carriage.

The air-pressure is controlled by valve mechanism consisting of suitable valves arranged in valve-chests $c^8$ $c^8$, which valves are provided with stems $c^9$ $c^9$, actuated by a lever mechanism, preferably operated by hand. As shown, two bell-crank levers $C^7$ $C^7$, actuating the valve-stems $c^9$ $c^9$, are connected by a bar $C^8$ so as to operate in unison. One of the cranks $C^7$ is mounted on a rod $c^{16}$, which is provided with a lever $c^{11}$, shown in dot-lines in Fig. 11. A bar $c^{12}$ extends from the lever $c^{11}$ and is provided with a roller $c^{13}$. A hand-lever $C^9$ is provided with an arm $c^{14}$, which carries a cam $c^{15}$, arranged to contact with the roller $c^{13}$, and thus longitudinally move the bar $c^{12}$ to actuate the valve mechanism. It is obvious that if preferred a compressed-air apparatus provided with a single air-cylinder may be employed.

The hand-lever $C^9$ is provided with an arm $c^{17}$, which limits the movement of the lever by contacting with stops $c^{18}$ and $c^{19}$, Fig. 9. A reciprocating rod $E^5$, more particularly described hereinafter, is provided with a stop $E^8$, which, contacting with the arm $c^{17}$, serves to reverse the movement of the lever, releasing the bar $c^{12}$, when a spring $C^{11}$ (shown in dot-lines in Figs. 7 and 11) serves to reverse the action of the valve mechanism and returns the parts to their normal positions.

The front clamping device D is, as before stated, supported upon a cross-head F, arranged to permit of a limited adjustment, Figs. 1, 2, 5, 6, and 13. Any preferred means may be employed to adjust the cross-head F, that shown consisting of a fixed cross-bar F', provided with threaded bolts $f$ $f$, seated in suitably-threaded holes, the ends of which bolts bear against the cross-head F and determine its position relative to the fixed cross-bar. The clamping-jaws comprise longitudinally-movable jaws $d$ $d'$, arranged in suitable guides in a casting D'. The compressed-air cylinder $D^2$ is provided with a piston and a piston-rod $d^2$, which rod at its free end engages with the block $d^7$, carrying toggle-levers $d^3$ $d^3$, one of which at its outer end engages with the jaw $d$ and the other with the jaw $d'$. The piston-rod is guided in the casting, as shown in Fig. 13. It is obvious that the movement of the piston-rod actuates the jaws. A cam $d^4$, mounted on the shaft A', actuates a lever $d^5$, pivotally connected to the bed and at its free end engaging with the valve-stem $d^6$, controlling the admission of air to the cylinder $D^2$, and consequently the operation of the clamping device.

The rear clamping device E, (shown more particularly in Figs. 3, 4, and 12,) which from its functions may more correctly be called a "press," is preferably fixed in its relation to the bed A, and comprises opposing jaws $e$ $e'$, longitudinally movable in the casting E'. A block $e^2$, mounted upon a bar $E^4$, engages toggle-levers $e^3$ $e^4$, which extend from said block to the jaws $e$ $e'$, respectively, and control their operation. The air-cylinder $E^2$, secured to the bed A is provided with a piston and a piston-rod $e^5$, which impart motion to the bar $E^4$ and the toggle-levers in any preferred manner. As shown, the piston-rod $e^5$ engages with a pivoted lever $E^3$ and actuates the same. The lever $E^3$ is connected with the bar $E^4$, carrying the block $e^2$, before referred to. The valve mechanism may be of any desired form, that shown being preferred. As shown, the valve-stem $e^6$ is operated by a bell-crank lever $e^7$, which at one end is connected with a bar $e^8$, having upon its outer end a roller $e^9$. A reciprocating rod $E^5$, Fig. 14, (shown also in dot-lines in Figs. 1 and 2,) carries upon it a trip $e^{11}$, secured to a bar $e^{12}$, pivoted to the rod $E^5$. On its course in one direction the trip, by reason of its form, passes behind the roller $e^9$ and forces the bar $e^8$ outward, actuating the bell-crank lever $e^7$, the valve-stem $e^6$, the connecting mechanism, and the press. A spring $e^{13}$ or equivalent means is employed to return the lever $e^8$ to its normal position and reverse the operation. Any preferred means may be employed to reciprocate the bar or rod $E^5$. As shown, Fig. 14, a bell-crank lever $E^6$, supported by the bed, is connected at one end with the rod, while the other end is connected with an eccentric $E^7$, mounted upon the shaft A'. The action of the eccentric, therefore, reciprocates the rod as described.

The operation of my device is as follows: A hub N is placed upon a vertical shaft or stud $n$ upon the cross-head $A^3$ and is retained thereon by any preferred means—as, for example, by a hand-screw $n'$. The hub is otherwise retained in proper relative position by suitable means, the preferred form of which will be hereinafter described. The operator, taking a spoke O, places it between the clamps C' C' with the hub end pointing toward the rear and extending between the jaws of the press E. Seizing then the hand-lever $C^9$ he operates the air-controlling mechanism, and thus the clamping device C, which seizes and firmly holds the spoke. The cross-head B', moving toward the shaft A', brings the outer or rim end of the spoke in proper position between the jaws $d$ $d'$. At this moment the clamping-jaws $d$ $d'$ are operated, firmly gripping the end of the spoke O, when the continued movement of the clamping device C, coöperating with the then-immovable front clamping device D, upsets and shapes the outer end of the spoke in a manner to facilitate the securing of the wheel-rim thereto—for example, substantially as shown in Figs. 19 and 20. The clamps C' C' extend to a point sufficiently near the rim end of the spoke to aid in thus upsetting and forming the end of the spoke. While this is being accomplished the cross-head A³, bearing the hub N, has approached the press E and the hub end of the spoke, which is then in line between the jaws of the press, has by the forward movement of the carriage A³, been forced into the recess in the extension N', formed on the hub for its reception. At the moment the extension N', Fig. 16, is in position between the jaws $e$ $e'$ of the press, and while the spoke is firmly held in position by the clamping device C the jaws are operated, firmly gripping the extension N' and forcibly pressing and bending the excess metal $n^2$, formed on the same, into depressions or irregularities formed on the end of the spoke for that purpose, as shown in Fig. 18. The various parts are so timed as to accomplish these operations without interference with one another and preferably in the order named, the clamping device C firmly holding the spoke in position during both operations thereon. As the air-pressure is automatically released by the valve mechanism the various parts of the machine are reversed, and the hub carried backward by the cross-head or carriage A³ draws with it the spoke O, the same passing through between the jaws of the press. Any preferred means may now be employed to shift or rotate the hub sufficiently to bring it in position for setting the next spoke. As shown in Figs. 1, 2, and 23, a weight-operated ratchet accomplishes this function. The operation described may be repeated until all the spokes are secured to the hub, when the latter, with its attached spokes, may be removed from the cross-head A³, another hub put in position, and the operation be repeated as desired. The rim of the wheel is later put in position by another operation.

The means shown for shifting the hub on the shaft $n$ is as follows: The pulley 1, shaft 3, ratchet-pulley 8, worm-screw 4, and shaft $n$ are suitably mounted on the carriage A³ and move therewith. The end of the band 9 engages with a suitable part on the bed—as, for example, with the end 7 of the hook 6, which may be adjustably held in the bracket 5, connected to the frame. A weight 11 is attached to the other end of the band. The worm-screw 4 engages with a suitable gear-wheel secured to and operating the shaft or stud $n$, Fig. 23. The mode of operation of this portion of my invention is as follows: As the carriage A³ moves forward the shaft $n$ is prevented from rotating by the locking of the hub in position, as hereinafter explained. This causes the ratchet-pulley 8 to be loosely rotated on the shaft, raising the weight. On the return motion the hub and shaft $n$ are unlocked. The ratchet-pulley 8, driven by the weight and band, engages and rotates the shaft 3 and the worm-screw 4, thus rotating the shaft $n$ and the hub thereon.

It is desirable in a machine of this kind that provision be made for firmly holding the hub in proper relative position or alinement, so that the end of the spoke will be guided into the extension N'. A slight displacement of the hub, so that the extension would not be in line with the spoke, would prevent the accurate assembling of the parts and seriously interfere with the successful operation of the machine. Any suitable means may be employed for this purpose, that shown being preferred. As shown in the drawings, Figs. 21 and 22, a bent or inclined spring-bar P is provided with extensions $p$, which embrace the extensions N' when the hub is in proper position and during the forward movement of the carriage. A lever R, provided with a roller $r$, riding upon the spring-lever P, is actuated by a connection with one of the rods $a'$, preferably by means of a bar $r'$, connecting therewith. As shown, the end of the rod $a'$ is slotted, permitting sufficient play to release the spring-bar before the end of the slot engages with the studs $r^2$ upon the cross-head A³. By this construction as the operation of the machine is reversed the initial movement of the rod $a'$ depresses the spring-bar P and releases the hub from its action, after which the rod contacts with the stud on the cross-head A³, moving the same rearward, actuating the ratchet device and rotating the hub, as described.

The several parts of the machine are preferably made of sufficient strength to perform the various operations upon metal while cold, which when of suitable nature is susceptible of such treatment.

It is obvious that after describing my improved machine various modifications may be made without in any way departing from the spirit of my invention. Thus the several clamps may be modified as desired or to suit particular forms of work. The air apparatus may be altered and arranged as preferred or as is most convenient. Steam or other medium may be substituted for the air. The valve mechanism may be of such character as may be preferred, and the various other parts be modified as desired without in any way materially changing the functions and general purposes of the machine. Hence I do not wish to be understood as limiting myself in such respects.

Where in the claims I refer to compressed-air apparatus, I wish to be understood as including steam or other apparatus operating in a substantially equivalent manner.

Having thus described my invention, what I claim as new, and desire to secure by Letters Patent, is—

1. A machine of the kind described, comprising a clamping device arranged to receive and firmly hold a spoke, and means for operating said device, a second clamping device arranged to engage with and firmly hold the rim end of the spoke, means for operating said device, and means for decreasing the distance between the two devices while so clamping the spoke, in combination with a press arranged to compress the spoke extension of a hub and the hub end of the spoke when assembled, and means for operating the press, substantially as described.

2. A machine of the kind described, comprising a clamping device arranged to receive and firmly hold a spoke and means for operating said device, a second clamping device arranged to engage with and firmly hold the rim end of the spoke, means for operating said device, and means for decreasing the distance between the two devices while so clamping the spoke, in combination with a hub-supporting member, a press, means for operating the press, and means for engaging the hub end of the clamped spoke with the hub spoke extension between the operating-jaws of the press, substantially as described.

3. A machine of the kind described, comprising a clamping device arranged to receive and firmly hold a spoke and means for operating said device, a second clamping device arranged to engage with and firmly hold the rim end of the spoke, means for operating said device, and means for decreasing the distance between the two devices while so clamping the spoke, in combination with a hub-supporting member, means for moving the same toward the clamped spoke and engaging the hub extension therewith, a press arranged to compress the hub extension firmly upon the spoke end, and means for operating said press, substantially as described.

4. A machine of the kind described, comprising a clamping device supported upon a movable carriage and arranged to receive and firmly hold a spoke, and means for operating said device, a second clamping device arranged to engage with and firmly hold the rim end of the spoke, means for operating said device, and means for forcibly moving the carriage toward the second clamping device while the spoke is firmly clamped by both devices, in combination with a press arranged to embrace the spoke extension of a hub and the hub end of the spoke when assembled, and means for operating the press, substantially as described.

5. A machine of the kind described, comprising a clamping device supported upon a movable carriage, and arranged to receive and firmly hold a spoke, and means for operating said device, a second clamping device provided with means for adjusting its position relative to the first device, and arranged to engage with and firmly hold the rim end of the spoke, means for operating said device, and means for forcibly moving the carriage toward the second clamping device while the spoke is so clamped by both devices, in combination with a press arranged to embrace a spoke extension of the hub and the hub end of the spoke when assembled, and means for operating the press, substantially as described.

6. A machine of the kind described, comprising a clamping device supported upon a movable carriage and arranged to receive and firmly hold a spoke, and means for operating said device, a second clamping device arranged to engage with and firmly hold the rim end of the spoke, means for operating said device, and means for forcibly moving the first clamping device toward the second while the spoke is so clamped by both devices, in combination with a hub-supporting member mounted upon a movable carriage, a press, means for operating the press, and means for moving the carriage supporting the hub to engage the hub extension with the hub end of the spoke between the operating-jaws of the press, substantially as described.

7. An upsetting-machine for forming the ends of spokes or rods, comprising a spoke or rod clamping device and means for operating the same, in combination with a second clamping device arranged to engage with and firmly hold the extreme end of the spoke or rod, means for operating said device, and means for decreasing the distance between the two devices while the spoke or rod is so clamped by both so as to upset the rod or spoke between them, substantially as described.

8. In a machine of the kind described, a driven shaft having mounted thereon one or more eccentrics, a movable cross-head or carriage and eccentric-rods connecting the eccentrics with said movable carriage, a clamping device supported by said carriage and arranged to receive and firmly hold a spoke or rod, and means for operating said clamping device, in combination with a second clamping device arranged to maintain a fixed position in relation to the first, and adapted to engage with and firmly hold the end of a spoke or rod positioned in the first device, and means for operating said second device, substantially as described.

9. In a machine of the kind described, a driven shaft A' having mounted thereon eccentrics B B, a movable carriage B' suitably supported upon ways, eccentric-rods connecting the eccentrics with the carriage, and a clamping device and means for operating the same supported by said carriage, in combination with a clamping device D, means for operating the same, and means for adjusting the position of the same relative to the clamping device upon the carriage, substantially as described.

10. In a machine of the kind described, a driven shaft A' having mounted thereon eccentrics B B, a carriage B' having mounted thereon a clamping device and means for operating the same, and eccentric-rods $b\ b$ connecting the eccentrics with the carriage, in combination with an adjustable cross-head F having mounted thereon a clamping device D, and means for operating said clamping device, a cross-bar F' and means for regulating the distance between the carriage F and the cross-bar F', substantially as described.

11. In a machine of the kind described, a periodically-reciprocated carriage B' having mounted thereon and carrying the following elements therewith: clamping-jaws C' C', an air-pressure apparatus, mechanism for controlling the same, an intermediate mechanism for transmitting the movement of the air-pressure mechanism to the jaws, in combination with a second clamping device arranged to engage with and firmly hold the end of a spoke or rod to coöperate with the action of the first clamping mechanism in forming the end of a spoke or rod, and means for operating the second clamping device, substantially as described.

12. In a machine of the kind described, a periodically-reciprocated carriage B' having mounted thereon and carrying therewith the following elements: clamping-jaws C' C', an air-pressure apparatus, longitudinally-movable rods $C^3$ $C^3$, means for operating the same, and toggle-levers arranged to transmit the movement of the rods $C^3$ $C^3$ to the clamping-jaws C' C', in combination with a second clamping device arranged to coöperate with the first in forming the end of a spoke or rod held by the clamping-jaws C' C' and means for operating the second clamping device, substantially as described.

13. In a machine of the kind described, a clamping device comprising a support having mounted thereon and carrying therewith opposing jaws, in combination with an air-pressure apparatus provided with a piston and piston-rod $d^2$, means for transmitting the movement of the piston-rod to operate the jaws, a valve-stem controlling the air-pressure apparatus, a lever connected with the valve-stem and a driven cam for operating the lever, substantially as described.

14. In a machine of the kind described, a clamping device comprising a movable support having mounted thereon and carrying therewith opposing jaws $d$ $d'$, in combination with an air-pressure apparatus provided with a piston and piston-rod $d^2$, a movable block $d^7$ operated by the action of said piston-rod, and toggle-bars $d^3$ $d^3$ transmitting the movement of the piston to the jaws $d$ $d'$ to move them in opposing directions, and means for controlling the air-pressure device, substantially as described.

15. In a machine of the kind described, a press comprising opposing jaws $e$ $e'$, in combination with an air-cylinder $E^2$ provided with a piston and a piston-rod $e^5$, intermediate mechanism transmitting the motion of the piston-rod to the jaws, a valve-stem $e^6$ controlling the operation of the air apparatus, and a reciprocating rod $E^5$ arranged to periodically operate the valve-stem, substantially as described.

16. In a machine of the kind described, a press comprising opposing jaws $e$ $e'$, and toggle-levers arranged to force the jaws toward each other, in combination with an air-cylinder $E^2$ provided with a piston and a piston-rod $e^5$, means for transmitting the motion of the piston-rod to the toggle-levers, a valve-stem $e^6$ controlling the operation of the air apparatus, a bell-crank lever $e^7$ connected with the valve-stem, a spring adapted to normally hold the bell-crank lever and valve-stem in an inoperative position, and a longitudinally-movable rod $E^5$ arranged to periodically operate the bell-crank lever against the force of the spring, substantially as described.

17. In a machine of the kind described, a press arranged substantially as described, an air-cylinder $E^2$ provided with a piston and a piston-rod $e^5$, means for transmitting the motion of the piston-rod to operate the press, a valve-stem $e^6$ controlling the operation of the air apparatus, a bell-crank lever $e^7$ attached at one end to the valve-stem and at the other end to a longitudinally-movable bar $e^8$, and a spring arranged to normally hold the bell-crank and valve-stem in an inoperative position, in combination with a longitudinally-movable rod $E^5$ provided with a trip $e^{11}$ adapted on the movement of the rod in one direction to engage with the bar $e^8$ to operate the same against the force of the spring, substantially as described.

18. In a machine of the kind described, a press substantially as described, a compressed-air apparatus arranged to operate the press, a valve-stem $e^6$ controlling the operation of the air apparatus, a bell-crank lever $e^7$ having one arm engaged with the valve-stem and the other arm with a longitudinally-movable bar $e^8$, and a spring adapted to hold the bell-crank lever in its normal position, in combination with a longitudinally-movable rod $E^5$ provided with a trip $e^{11}$ adapted to engage the bar $e^8$ and operate the same against the force of the spring, a driven shaft A', and mechanism connecting the shaft with the bar $E^5$ and arranged to periodically reciprocate the same, substantially as described.

19. A hub and spoke assembling machine, comprising a spoke-clamping device and means for operating the same, in combination with a reciprocating hub-carriage, means for mounting and retaining a hub thereon, a press arranged between the clamp and the hub-carriage in line with the engaged hub and spoke, and means for operating the press, substantially as and for the purpose set forth.

20. In a machine of the kind described, a clamping device arranged to receive and firmly hold a spoke and means for operating the same, in combination with a reciprocating carriage $A^3$ provided with a hub-support, means for periodically rotating the hub a limited distance thereon, a press arranged between the clamping device and the carriage, and means for operating said press, substantially as described.

21. In a machine of the kind described, a clamping device arranged to receive and firmly hold a spoke and means for operating the same, a reciprocating carriage A³ provided with a hub-supporting shaft $n$, a ratchet device for periodically rotating the hub a limited distance to bring the hub extension in line with a spoke positioned in the clamping device and upon the reciprocation of the carriage to engage the two, in combination with a press arranged between the clamping device and the carriage in line with the engaged hub and spoke, and means for operating said press, substantially as described.

22. In a machine of the kind described, a clamping device arranged to receive and firmly hold a spoke and means for operating said device, a reciprocating carriage A³ provided with a rotatable hub-supporting shaft $n$, means for securing a hub thereon, means for periodically rotating the shaft and hub a limited distance to successively bring the hub extensions in line with the spoke and upon the forward movement of the carriage engage the two, and a locking device supported by the carriage and adapted to securely lock the hub in such position, in combination with a press arranged between the clamping device and the carriage in line with the engaged hub and spoke, and means for operating said press, substantially as described.

23. A hub and spoke assembling machine, comprising a spoke-clamping device and means for operating the same, in combination with a longitudinally-movable hub-carriage, means for mounting and retaining a hub thereon, a driven shaft, means for transmitting the motion of the shaft to reciprocate the hub-carriage, a press arranged between the clamp and the hub-carriage in line with the engaged spoke and hub, and means for operating the press, substantially as and for the purpose set forth.

24. A hub and spoke assembling machine, comprising a spoke-clamping device and means for operating the same, in combination with a longitudinally-movable hub-carriage, means for mounting and retaining a hub thereon, a driven shaft, means for transmitting the motion of the shaft to reciprocate the carriage, a press arranged between the clamp and the hub-carriage in line with the engaged hub and spoke, and means driven by the shaft for controlling the press, substantially as and for the purpose set forth.

25. In a machine of the kind described, a reciprocating carriage A³ provided with a rotatable hub-supporting shaft $n$, means for securing a hub thereto, and means for periodically rotating the hub a limited distance as described, in combination with a locking device comprising a spring-lever P constructed at its free end to engage the hub to lock the same in its adjusted position, an operating-lever R arranged at one end to engage the spring-lever to operate the same, and means for periodically operating the lever R, substantially as described.

26. In a machine of the kind described, a clamping device comprising the following elements in combination: a reciprocated carriage having mounted thereon and carrying therewith clamping-jaws C' C', an air-pressure apparatus, valve mechanism for controlling the same, and mechanism for transmitting the movement of the air-pressure apparatus to operate the jaws, substantially as described.

27. In a machine of the kind described, clamping mechanism comprising the following elements in combination: a reciprocated carriage B' having mounted thereon and carrying therewith clamping-jaws C' C', an air-pressure apparatus, longitudinally-movable rods C³ C³, mechanism connecting the air-pressure apparatus with the latter to operate the same, and toggle-levers arranged to transmit the movement of the rods to the clamping-jaws, substantially as described.

28. In a machine of the kind described, clamping mechanism comprising the following elements in combination: a reciprocated carriage B' having mounted thereon and carrying therewith clamping-jaws C' C', reinforcing-bars C² C², slides $c\ c$, &c., toggle-levers $c^3\ c^3$, &c., longitudinally-movable bars C³ C³, a rock-shaft C⁴, crank-arms $c^5$ transmitting the movement of the rock-shaft to the rods C³, and an air-pressure apparatus adapted to operate the rock-shaft, substantially as described.

GEORGE W. PACKER.

Witnesses:
J. F. STEWARD,
WM. A. DREFFEIN.